United States Patent
Schütze et al.

[11] Patent Number: 5,932,723
[45] Date of Patent: Aug. 3, 1999

[54] PHASE-DIRECTED PREPARATION OF METAL-FREE PHTHALOCYANINE

[75] Inventors: Andrea Birgit Schütze, Worms; Frank Scherhag, Limburgerhof; Ingo Klopp, Lambsheim; Anette Hartmann, Kirrweiler, all of Germany

[73] Assignee: BASF Aktiengesellschaft, Ludwigshafen, Germany

[21] Appl. No.: 08/991,780

[22] Filed: Dec. 16, 1997

[51] Int. Cl.⁶ .................................................. C09B 47/04
[52] U.S. Cl. .......................... 540/143; 540/141; 540/122; 106/410; 106/412; 106/272; 106/493
[58] Field of Search .................................. 540/141, 143, 540/122; 106/410, 412, 272, 493

[56] References Cited

U.S. PATENT DOCUMENTS

| | | | |
|---|---|---|---|
| 3,357,989 | 12/1967 | Byrne et al. | 260/314.5 |
| 3,708,293 | 1/1973 | Brach et al. | 96/1.5 |
| 4,069,064 | 1/1978 | Nett et al. | 106/193 P |
| 4,151,171 | 4/1979 | Kurkov | 260/326.5 |
| 4,205,995 | 6/1980 | Wheeler et al. | 106/288 Q |
| 4,256,507 | 3/1981 | Kranz et al. | 106/288 Q |
| 5,264,032 | 11/1993 | Dietz et al. | 106/411 |
| 5,367,069 | 11/1994 | Beck et al. | 540/122 |
| 5,432,277 | 7/1995 | Boettcher et al. | 540/122 |
| 5,569,758 | 10/1996 | Klopp et al. | 540/122 |

FOREIGN PATENT DOCUMENTS

| | | |
|---|---|---|
| 0 093 331 | 11/1983 | European Pat. Off. . |
| 0 535 774 | 4/1993 | European Pat. Off. . |
| 0 538 784 | 4/1993 | European Pat. Off. . |
| 0 570 750 | 11/1993 | European Pat. Off. . |
| 0 658 604 | 6/1995 | European Pat. Off. . |
| 2 307 022 | 11/1976 | France . |
| 2 321 527 | 3/1977 | France . |
| 2 364 954 | 4/1978 | France . |
| 2 372 870 | 6/1978 | France . |
| 2 218 788 | 12/1972 | Germany . |
| 25 16 054 | 4/1975 | Germany . |
| 29 05 114 | 7/1980 | Germany . |
| 42 34 922 | 4/1994 | Germany . |

OTHER PUBLICATIONS

Shigemasa Takano, et al., Chemistry Letters, pp. 2037–2040, 1984, "A New Polymorph of Metal–Free Phthalocyanine".

*Primary Examiner*—Richard L. Raymond
*Assistant Examiner*—Pavanaram K. Sripada
*Attorney, Agent, or Firm*—Oblon, Spivak, McClelland, Maier & Neustadt, P.C.

[57] ABSTRACT

A process for preparing metal-free phthalocyanine by reductive cyclization of phthalonitrile in the presence of an aliphatic alcohol, of a redox catalyst and of an inorganic base comprises effecting the cyclization in the presence of one or more phthalocyanine derivatives selected from the group consisting of phthalocyanine-sulfonic acids and -carboxylic acids and their alkali metal, ammonium and alkylarnozium salts, the amino-substituted and aminomethylated phthalocyanines and their reaction products with alkylating agents, sulfonic acids, sulfonyl chlorides and carbonyl chlorides, the imidomethylene- and amidomethylene-substituted phthalocyanines, the alkyl-, aryl- and cyano-substituted phthalocyanines, the hydroxyl- and alkoxy-substituted phthalocyanines and their reaction products with tetraalkyl- and tetraalkoxy-silanes and the halogenated phthalocyanines.

19 Claims, No Drawings

PHASE-DIRECTED PREPARATION OF METAL-FREE PHTHALOCYANINE

DESCRIPTION

The present invention-relates to a novel process for preparing metal-free phthalocyanine with control of the polymorph formed by reductive cyclization of phthalonitrile in the presence of an aliphatic alcohol, of a redox catalyst and of an inorganic base.

The invention further relates to a novel polymorph of metal-free phthalocyanine, which is characterized by an X-ray powder diagram ($CuK_\alpha$) having the essential lines at $2\theta$ angles of 5.0, 8.3, 9.6, 13.0, 14.4, 16.8, 21.5, 24.2 and 26.8°.

Metal-free phthalocyanine

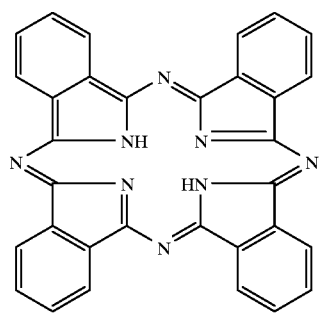

is attracting increasing interest for use as pigment for the blue to green spectrum and is known to exist in various polymorphs (The Phthalocyanines, CRC Press Inc. 1983). The literature describes the polymorphs $\alpha$, $\beta$, X and $\pi$ ($\pi$ as a mixture with X-$H_2$Pc and $\pi$-CoPc; see also U.S. Pat. No. 3,357,989, DE-A-22 18 788), $\tau$ (Chem. Letters 1984, 2037–2040) and $\gamma$ (DE-A-42 34 922).

The process described in EP-A-658 604, wherein phthalonitrile is reductively cyclized in the presence of glycols, hydroxybenzenes and inorganic bases, can be used to prepare various polymorphs of metal-free phthalocyanine ($\beta$-, $\gamma$-, X- and $\pi$-$H_2$Pc), but in many cases it is necessary to add seed crystals of the desired polymorph, which have to be synthesized separately. In addition, the phthalocyanine obtained generally has to be subjected to a finishing process before it can be used for pigmenting duty.

It is an object of the present invention to remedy the aforementioned defects and to provide a technically simple, economical process for a controlled synthesis of the various polymorphs of metal-free phthalocyanine.

We have found that this object is achieved by a process for preparing metal-free phthalocyanine with control of the polymorph formed by reductive cyclization of phthalonitrile in the presence of an aliphatic alcohol, of a redox catalyst and of an inorganic base, which comprises effecting the cyclization in the presence of one or more phthalocyanine derivatives selected from the group consisting of phthalocyanine-sulfonic acids and -carboxylic acids and their alkali metal, ammonium and alkylammonium salts, the amino-substituted and aminomethylated phthalocyanines and their reaction products with alkylating agents, sulfonic acids, sulfonyl chlorides and carbonyl chlorides, the imidomethylene- and amidomethylene-substituted phthalocyanines, the alkyl-, aryl- and cyano-substituted phthalocyanines, the hydroxyl- and alkoxy-substituted phthalocyanines and their reaction products with tetraalkyl- and tetraalkoxy-silanes and the halogenated phthalocyanines.

The phthalocyanine derivatives used can be not only metal-free phthalocyanine derivatives ($H_2$Pc derivates) but also metal-containing phthalocyanine derivatives, of which copper phthalocyanine derivatives (CuPc derivatives) are preferred.

The degree of substitution of these derivatives can be up to 8.0, but preferably it is within the range from 0.1 to 4.0, especially within the range from 1.0 to 3.5.

Particularly suitable phthalocyanine derivatives conform to the general formula I

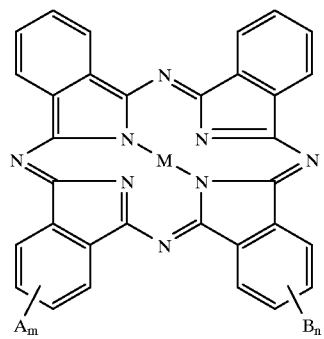

where
where

M is copper or 2 hydrogen atoms;

A and B are each independently selected from the following substituents: $—SO_3M^1$, $—CO_2M^1$, $—SO_3H\text{-}HNR^1R^2$, $—CH_2NR^3R^4$, $—NR^3R^4$, $—CH_2NR^3R^4\text{-}HO_3SR^5$, $—NR^3R^4\text{-}HO^3SR^5$, $—NHCOR^1$, $—CH_2NHCOR^1$, $—NHSO_2R^1$, $—CH_2NHSO_2R^1$, $SO_2NHR^1$, $—CONHR^1$, $C_1\text{-}C_6$-alkyl, aryl, cyano, $—OR^6$ and halogen, where $R^1$ and $R^2$ are each independently of the other hydrogen or $C_2\text{-}C_{20}$-alkenyl or $C_1\text{-}C_{20}$-alkyl with or without $—NR^7R^8$ substitution, $R^7$ and $R^8$ each being independently of the other $C_1\text{-}C_{20}$-alkyl, $C_5\text{-}C_8$-cycloalkyl with or without one or more hetero atoms, or hydrogen, $R^3$ and $R^4$ are each independently of the other hydrogen, $C_1\text{-}C_{20}$-alkyl, $C_2\text{-}C_{20}$-alkenyl or aryl or join to form a 5- or 6-membered ring which contains the nitrogen atom and optionally further heteroatoms or carbonyl or sulfonyl groups and is or is not benzofused, $R^5$ is p-($C_{10}\text{-}C_{20}$-alkyl)phenyl or $C_2\text{-}C_{20}$-alkenyl, $R^6$ is hydrogen, $C_1\text{-}C_6$-alkyl or $—Si(R^9)_3$, where $R^9$ is $C_1\text{-}C_4$-alkyl, $C_2\text{-}C_4$-alkenyl or $C_1\text{-}C_4$-alkoxy;

$M^1$ is hydrogen or an alkali metal;

m is an integer or fraction >0 to 4.0; and n is an integer or fraction from 0 to 4.0.

Specific examples of the radicals A and B contained in the formula I and of their substituents are:

straight-chain or branched $C_1\text{-}C_{20}$-alkyl radicals such as methyl, ethyl, propyl, isopropyl, butyl, isobutyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the designations isooctyl, isononyl, isodecyl and isotridecyl are trivial names derived from the alcohols obtained by the oxo process—cf. Ullmann's Encyklopädie der technischen Chemie, 4th Edition, Volume 7, pages 215 to 217, and also Volume 11, pages 435 and 436);

straight-chain or branched $C_2$–$C_{20}$-alkanyl radicals such as ethenyl, propenyl, isoproperyl, butenyl, isobuteryl, pentenyl, hexenyl, heptenyl, octenyl, norienyl, decenyl, undecenyl, dodecenyl, tridecenyl-, tetradecenyl, pentadeceryl, hexadecenyl, heptadecenyl, octadecenyl, nonadecenyl and eicosenyl;

straight-chain or branched $C_1$–$c6$-alkoxy radicals such as methoxy, ethoxy, propoxy, isopropoxy, butoxy, isobutoxy, tert-butoxy, pentoxy, isopentoxy, neopentoxy, tert-pentoxy and hexoxy;

$C_5$–$C_8$-cycloalkyl radicals which may contain heteroatoms such as oxygen and/or nitrogen as replacement for one or more carbon atoms but are not attached via these heteroatoms, such as cyclopentyl, cyclohexyl, cycloheptyl, cyclooctyl, tetrahydrofuryl, pyrrolidyl, piperidyl, piperazyl and morpholinyl;

aryl radicals such as naphthyl and especially phenyl;

p-($C_{10}$–$C_{20}$-alkyl)phenyl radicals such as p-decyl-, p-undecyl-, especially p-dodecyl-, also p-tridecyl-, p-tetradecyl-, p-pentadecyl, p-hexadecyl-, p-heptadecyl-, p-octadecyl-, p-nonadecyl- and p-eicosyl-phenyl;

carboxyl, preferably sulfo and mono($C_{10}$–$C_{20}$-alkyl) ammonium sulfonate radicals such as monodecyl-, monodecyl-, monododecyl-, monotridecyl-, monotetradecyl-, monopentadecyl-, especially monohexadecyl-, also monoheptadecyl-, monooctadecyl-, monononadecyl- and monoeicosyl-ammonium sulfonate radicals;

mono- and di($C_1$–$C_6$-alkyl)amino radicals such as mono- and dimethylamino, mono- and especially diethylamino, mono- and dipropylamino, mono- and diisopropylamino, mono- and dibutylamino, mono- and diisobutylamino, mono- and dipentylamino and mono- and dihexylamino, especially mono- and preferably di-($C_1$–$C_6$-alkyl)aminomethyl radicals in which the amino radicals mentioned are attached to the phthalocyanine structure via a methylene group;

reaction products of mono- and di($C_1$–$C_6$-alkyl)amino radicals and preferably of the corresponding aminomethyl radicals with $C_{10}$–$C_{20}$-alkylphenylsulfonic acids such as p-decyl-, p-undecyl-, especially p-dodecyl-, also p-tridecyl-, p-tetradecyl-, p-pentadecyl, p-hexadecyl-, p-heptadecyl-, p-octadecyl-, p-nonadecyl- and p-eicosylphenyl-sulfonic acids, the alkyl radicals being ortho-, meta- or preferably para-disposed relative to the sulfonic acid group, for example —$CH_2$—$N(C_2H_5)_2.HO_3S$—Ph—4—$C_{12}H_{25}$ and —$CH_2$—NH $C_2H_5).HO_3S$—Ph—$4C_{12}H_{25}$;

heterocycloalkyl and heteroaryl radicals which contain the amine nitrogen atom and are attached via it, such as 4-morpholinyl, pyrrolidyl, piperidyl, piperazyl, pyrazolyl, pyrryl, pyrazyl, imidazyl, especially N-phthalimidyl and N-saccharinyl and also preferably the corresponding radicals attached to the phthalocyanine structure via —$CH_2$—;

mono($C_1$–$C_{20}$-alkylcarbonyl)amino radicals such as monomethyl-, monoethyl-, monopropyl-, monoisopropyl-, monobutyl-, monoisobutyl-, tert-monobutyl-, monopentyl-, monoisopentyl-, mononeopentyl-, tert-monopentyl-, monohexyl-, 2-monomethylpentyl-, monoheptyl-, 1-monoethylpentyl- monooctyl-, 2-monoethylhexyl-, monoisooctyl -, monononyl-, monoisononyl-, monodecyl-, monoundecyl-, monododecyl-, monotridecyl-, monotetradecyl-, monopentadecyl-, especially monohexadecyl-, also monoheptadecyl-, monooctadecyl-, monononadecyl- and monoeicosyl-carbonylamino and also the corresponding amino radicals attached to the phthalocyanine structure via —$CH_2$—;

mono($C_1$–$C_{20}$-alkylsulfonyl)amino radicals such as monomethyl-, monoethyl-, monopropyl-, monoisopropyl-, monobutyl-, monoisobutyl-, tert-monobutyl-, monopentyl-, monoisopentyl-, mononeopentyl-, tert-monopentyl-, monohexyl, 2-monomethyl-pentyl-, monoheptyl-, 1-monoethylpentyl-, monooctyl-, 2-monoethylhexyl-, monoisooctyl-, monononyl-, monoisononyl-, monodecyl-, monoundecyl-, monododecyl-, monotridecyl-, monotetradecyl-, monopentadecyl-, especially monohexadecyl-, also monoheptadecyl-, monooctadecyl-, monononadecyl- and monoeicosyl-sulfonylamino and also the corresponding amino radicals attached to the phthalocyanine structure via —$CH_2$—;

mono($C_1$–$C_{20}$-alkylamino)sulfonyl radicals such as monomethyl-, monoethyl-, monopropyl-, monoisopropyl-, monobutyl-, monoisobutyl-, tert-monobutyl-, monopentyl-, monoisopentyl-, mononeopentyl-, tert-monopentyl-, monohexyl-, 2-monomethyl-pentyl-, monoheptyl-, 1-monoethylpentyl-, monooctyl-, 2-monoethylhexyl-, monoisooctyl-, monononyl-, monoisononyl-, monodecyl-, monoundecyl-, monododecyl-, monotridecyl-, monotetradecyl-, monopentadecyl-, especially monohexadecyl-, also monoheptadecyl-, monooctadecyl-, monononadecyl- and monoeicosyl-aminosulfonyl, wherein the alkyl radicals can carry a terminal amino or mono- or di($C_1$–$C_6$-alkyl)amino group;

mono($C_1$–$C_{20}$-alkylamino)carbonyl radicals such as monomethyl-, monoethyl-, monopropyl-, monoisopropyl-, monobutyl-, monoisobutyl-, tert-monobutyl-, monopentyl-, monoisopentyl-, moroneopentyl-, tert-monopentyl-, monohexyl-, 2-monomethylpentyl-, monoheptyl-, 1-monoethylpentyl-, monooctyl-, 2-monoethylhexyl-, monoisooctyl-, monononyl-, monoisononyl-, monodecyl-, monoundecyl-, monododecyl-, monotridecyl-, monotetradecyl-, monopentadecyl- especially monohexadecyl-, also monoheptadecyl-, monooctadecyl-, monononadecyl- and monoeicosyl-aminocarbonyl, wherein the alkyl radicals can carry a terminal amino or mono- or di($C_1$–$C_6$-alkyl)amino group;

cyano, hydroxyl and halogen such as bromine and especially chlorine;

tri($C_1$–$C_4$-alkyl)silylaxy, tri($C_2$–$C_4$-alkenyl)silyloxy and tri($C_1$–$C_4$-alkoxy)silyloxy radicals such as trimethyl-, trivinyl- and trimethoxy-silyloxy.

The degree of substitution (m+n) of the phthalocyanine derivative I can be up to 8; that is, the phthalocyanine structure can bear 8 identical substituents (A=B) or 2 different substituents A and B (A+B), in which case m+n is not more than 8.

The degree of substitution is preferably within the range from 0.1 to 4, particularly preferably within the range from 0.1 to 3.5.

The phthalocyanine derivative I is preferably substituted by only one kind of substituent (n=0 or A=B), but it is also possible to use, for example, phthalocyanine derivatives which have been partially halogenated (especially chlorinated) or sulfonated and bear an additional aubstituent other than halogen or sulfo.

The phthalocyanine derivatives I are known per se and preparable by known methods (for example EPA 535 774, DE-A-25 16 054, EP-A-538 784 and DE-A-29 05 114).

In general, the process of the invention is carried out using from 1 to 20% by weight, preferably from 3 to 15% by weight, of phthalocyanine derivative I, based on the amount of phthalonitrile used.

The total amount of phthalocyanine derivative I desired may be present right at the start of the synthesis, but the phthalocyanine derivative I can also be added incrementally after one or more time intervals. Of course, just one phthalocyanine derivative I can be used, or a plurality of, for example two, different derivatives I.

Solvents used in the process of the invention are preferably aliphatic alcohols such as glycols, glycol monoethers, amino alcohols and dialkylamino alcohols and also mixtures thereof, which also act as reducing agents.

Suitable solvents/reducing agents are in particular not only mono- but also oligo- (especially di- and tri-) and poly-$C_2$–$C_5$-alkylene glycols and their mono-$C_1$–$C_8$-alkyl and monoaryl ethers, preference being given to propylene-based compounds and particular preference being given to ethylene-based compounds, and also amino- and N,N-di ($C_1$–$C_4$-alkyl)amino-$C_2$–$C_6$-alcohols.

Specific examples are ethylene glycol, 1,2- and 1,3-propylene glycol, butylene glycols, pentylene glycols, di-, tri- and tetraethylene and -propylene glycols, polyethylene glycols, polypropylene glycols, ethylene glycol monomethyl, monoethyl, monopropyl, monobutyl and monohexyl ether and also propylene glycol monomethyl, monoethyl, monopropyl, monobutyl and monohexyl ether, di-, tri- and tetraethylene glycol monomethyl, monoethyl and monobutyl ether and di-, tri- and tetrapropylene glycol monomethyl, monoethyl and monobutyl ether, ethylene glycol monophenyl ether, propylene glycol monophenyl ether and also aminoethanol, aminopropanol, 2-aminopropanol, N,N-dimethylamino-ethanol, N,N-dimethylaminopropanol and N,N-dimethylamino-propan-2-ol.

The amount of solvent is not critical per se and is advantageously chosen so that a readily stirrable pigment suspension is present. It is advantageous to use, for example, a weight ratio of solvent to phthalonitrile within the range from 20:1 to 1:1, especially within the range from 5:1 to 2:1. The solvent can be regenerated after the reaction and used for further reactions.

The redox catalyst used is preferably selected from aromatic compounds of the formula II. Suitable aromatic compounds of the formula II are naphthalene and especially benzene, which each bear at least one, preferably 2, or else up to 4, hydroxyl and/or mercapto groups as substituents X. The aromatic rings may further bear up to 5 substituents Y: hydroxyl, mercapto, amino, mono- and di($C_1$–$C_6$-alkyl) amino, such as monomethylamino, monoethylamro or monobutylamino, dimethylamino, diethylamino or dibutylamino, halogen, such as chlorine or bromine, $C_1$–$C_6$-alkyl, preferably methyl or ethyl, $C_1$–$C_6$-alkoxy, preferably methoxy or ethoxy, and $C_1$–$C_6$-alkoxycarbonyl, preferably methoxycazbonyl or ethoxycarbonyl. The substituents X and Y can be identical or different in each case, and their sum total (m+n) should be $\leq 6$.

Examples of suitable redox catalysts II are α- and especially β-naphthol, 2-, 3- and 4-aminophenol, o-, m- and p-cresol (2-, 3- and 4-methylphenol), preferably phenol, thiophenol, o-, m- and p-mercaptophenol, particularly preferably pyrogallol (1,2,3-trihydroxybenzene) and the dihydroxybenzenes pyrocatechol (1,2), resorcinol (1,3) and especially hydroquinone (1,4). It is of course also possible to use mixtures of these compounds.

The amount of redox catalyst II is generally within the range from 1 to 25, preferably from 2 to 15, particularly preferably from 2 to 12, mol %, based on phthalonitrile.

Suitable inorganic bases are in particular alkali metal hydroxides, oxides and carbonates and also their mixtures. Emphasis is given to potassium oxide, potassium carbonate and especially potassium hydroxide, particularly sodium oxide, sodium carbonate and especially sodium hydroxide and lithium oxide, lithium carbonate and especially lithium hydroxide, which are preferably used as anhydrous solid or dissolved in alcohol. It is also possible to use ammonia gas as base.

In general, from 1 to 50, preferably from 2 to 25, mol % of inorganic base are used, based on phthalonitrile.

In the process of the invention, the alkali metal does not become incorporated in the phthalocyanine.

The reaction temperature is generally within the range from 80° to 200° C., preferably within the range from 100° to 200° C., particularly preferably within the range from 140° to 180° C.

An advantage of the process of the invention is that it can be carried out under atmospheric pressure.

The process of the invention makes it possible to prepare in a specific manner whichever polymorph of metal-free phthalocyanine is desired, simply by convenient variation of the reaction parameters.

The process of the invention is particularly suitable for preparing the π-, τ- and γ-polymorphs of $H_2Pc$, which are all obtainable without the use of seed crystals of the respective phase.

In addition, the process of the invention makes it possible to prepare a new polymorph of $H_2Pc$, which is characterized by the initially reported lines in the X-ray powder diagram and also by an IR spectrum having strong absorption bands at 1333, 1320, 1118, 1110, 1093, 1005, 873, 748, 735, 730 and 716 $cm^{-1}$ and is notable for an extremely reddish hue.

For instance, the novel polymorph of the metal-free phthalocyanine is advantageously obtainable by the following process variants: by reductive cyclization of phthalonitrile a) at reaction temperatures from 100 to 200° C., especially from 100 to 150° C., in diethylene glycol and in the presence of lithium hydroxide as base, a redox catalyst II bearing at least 2, preferably 3, hydroxyl groups and from about 6 to 10% by weight of a CuPc derivative I substituted by from 0.5 to 3.0, preferably from 1.0 to 2.0, sulfonic acid groups/molecule, or from about 9 to 15% by weight of an $H_2Pc$ derivative I substituted by one of the radicals —$CH_2NR^2R^3HO_3SR^4$ with a degree of substitution within the range from 1.5 to 4.0, especially within the range from 1.5 to 3.0, or b) at from 150 to 200° C. in ethylene glycol monobutyl ether or diethylene glycol monomethyl ether and in the presence of sodium hydroxide as base, a redox catalyst II bearing 2 hydroxyl groups and from about 9 to 15% by weight of an $H_2Pc$ derivative I substituted with a degree of substitution within the range from 2.5 to 5.0 by one of the radicals —$CH_2NR^2R^3$ wherein $R^2$ and $R^3$ join with the amine nitrogen atom to form a heterocycle (preferably phthalimidyl or saccharinyl).

The π-polymorph of metal-free phthalocyanine is preferably obtained according to the invention at reaction temperatures from 100 to 200° C., especially at from 100 to 180° C., in diethylene glycol and in the presence of lithium hydroxide as base, a redox catalyst II bearing 2 hydroxyl groups and from about 3 to 5% by weight of a copper phthalocyaninesulfonic acid I having a degree of substitution within the range from 0.5 to 3.0, preferably within the range from 1.0 to 2.0, or from about 1 to 20% by weight of a metal-free phthalocyaninesulfonic acid having the same degree of substitution.

The γ-polymorph of $H_2Pc$ is prepared according to the invention at from 100 to 200° C., preferably at from 120 to 180° C., a) in ethylene glycol monobutyl ether and in the presence of sodium hydroxide as base, a redox catalyst II bearing at least 2 hydroxyl groups and from about 5 to 15% by weight of a reaction product (I) of chlorinated copper phthalocyaninesulfonic acid (degree of sulfonation from 0.5 to 3.0, preferably from 1.0 to 2.0; degree of chlorination from 0.1 to 3.0, especially from 0.1 to 1.0) with a mono($C_1$–$C_{20}$)alkylamine or from about 5 to 10% by weight of a CuPc derivative I substituted with a degree of substitution from 2.0 to 4.0, especially from 2.5 to 4.0 by a radical —$CH_2NR^2R^3$ wherein $R^2$ and $R^3$ join with the amine nitrogen atom to form a heterocycle (especially saccharinyl), or b) in ethylene glycol monophenyl ether and in the presence of lithium hydroxide as base, a redox catalyst II bearing preferably 3 hydroxyl groups and from about 1 to 10% by weight, preferably from 4 to 6% by weight, of a reaction product (I) of metal-free, N,N-di($C_1$–$C_6$-alkyl) aminomethylated phthalocyanine (degree of substitution from 0.5 to 3.5, especially from 2.0 to 3.5) with a p-($C_{10}$–$C_{20}$-)alkyl-substituted benzene-sulfonic acid.

The γ-polymorph of $H_2Pc$ can be prepared according to the invention at from 100 to 200° C., for example in ethylene glycol or diethylene glycol or their monomethyl or monobutyl ethers, using lithium hydroxide, sodium hydroxide or potassium hydroxide or ammonia as base at from 100 to 200° C. The redox catalysts II used preferably bear 2 or 3 hydroxyl groups. Suitable phthalocyanine derivatives I are especially N,N-di($C_1$–$C_6$-alkyl)aminomethylated CuPc having a degree of substitution from 2.0 to 4.0, preferably from 2.0 to 3.5, in an amount from about 1 to 10% by weight, its reaction products with p-($C_{10}$–$C_{20}$-alkyl)-substituted benzenesulfonic acids in an amount from about 1 to 20% by weight, preferably from 3 to 15% by weight, CuPc derivatives I substituted by —$CH_2NR_3R_4$ radicals, wherein $R_3$ and $R^4$ join with the amine nitrogen atom to form a heterocycle (especially phthalimidyl and saccharinyl), with a degree of substitution from 1.5 to 3.5, in an amount from about 1 to 20% by weight, especially from 6 to 9% by weight, and also reaction products of N,N-di-($C_1$–$C_6$-alkyl)aminomethylated $H_2Pc$ (degree of substitution from 0.5 to 3.5, preferably from 1.0 to 3.0) with p-($C_{10}$–$C_{20}$-alkyl)-substituted benzene-sulfonic acids in an amount from about 1 to 20% by weight, preferably from 3 to 10% by weight.

The process of the invention car be carried out as follows: phthalonitrile, phthalocyanine derivative I and redox catalyst II are dissolved in the solvent with or without heating. The inorganic base is then added, dissolved in the solvent or as a solid. The reaction mixture is then heated to the desired reaction temperature and held at that temperature until phthalonitrile is quantitatively consumed, which generally takes from 15 min to about 8 h and depends on the reaction temperature. During this time, further phthalocyanine derivative I can be added to the reaction mixture, in which case the derivative I used at the start of the synthesis or some other derivative I can be used.

The workup of the reaction mixture for the product can be effected, advantageously after cooling down to from about 80 to 100° C., by filtration, washing with the solvent used for the reaction or other alcohols such as methanol or ethanol or N-methylpyrrolidone and subsequent, if desired, with water or acetone and drying.

The process of the invention makes it possible to prepare metal-free phthalocyanine in the desired polymorphs (the known π-, τ- and γ-phases, which are phase-stable in the presence of aromatic solvents, and the novel polymorph disclosed herein) in the desired particle size and particle size distribution in a controlled, technically simple and economical manner in high purity and good yield. It is of particular advantage that the phthalocyanine obtained can be used directly, without the otherwise customary finishing steps (grinding and/or solvent treatment), as a pigment for coloring printing iris, paints and plastics.

EXAMPLES

Preparation of Metal-Free Phthalocyanine ($H_2Pc$) of the π-, τ- and γ-Polymorph and of the Novel Polymorph 120 g of phthalonitrile, a g of the phthalocyanine derivative I

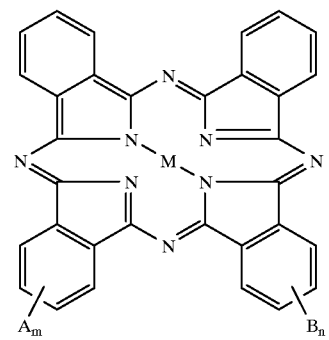

I and b g of the redox catalyst II were heated to 100° C. in c g of alcohol G with stirring. After addition of d g of the inorganic base B, the mixture was additionally heated at T° C. for 4 h.

In Examples 45 to 47, 2 hours of heating at 160° C. were followed by the addition of a further 3.6 g (Ex. 45), 7.2 g (Ex. 46) or 10.8 g (Ex. 47) of phthalocyanine derivative I. Thereafter heating was continued at 160° C. for a further 2 h.

After cooling down to 80–100° C., the product was filtered off, washed initially with alcohol G and then with water and then dried at 80–100° C.

Details of these experiments and their results are summarized in the table which follows.

Key

BG≙ethylene glycol monobutyl ether

DG≙diethylene glycol

MDG≙diethylene glycol monomethyl ether

PG≙ethylene glycol monophenyl ether

DMAE≙N,N-dimethylaminoethanol

H≙hydroquinone

P≙pyrogallol

TABLE

| Ex. | a g | Phthalocyanine derivative I | b g | II | c ml | G | d g | B | T [° C.] | Yield [g]; polymorph |
|---|---|---|---|---|---|---|---|---|---|---|
| 1 | 7.2 | A = —SO$_3$H; m = 1.3; n = 0; M = Cu | 5.0 | H | 440 | DG | 2.0 | LiOH | 120 | 102.3; H$_2$Pc new |
| 2 | 10.8 | A = —SO$_3$H; m = 1.3; n = 0; M = Cu | 5.0 | H | 450 | DG | 2.0 | LiOH | 120 | 112.3; H$_2$Pc new |
| 3 | 5.4 | A = —SO$_3$H; m = 1.3; n = 0; M = Cu | 5.7 | P | 440 | DG | 2.0 | LiOH | 120 | 117.6; H$_2$Pc new |
| 4 | 12.0 | A = —SO$_3$H; m = 1.3; n = 0; M = Cu | 20.0 | H | 490 | DG | 2.0 | LiOH | 120 | 106.3; H$_2$Pc new |
| 5 | 7.2 | A = —CH$_2$—N(C$_2$H$_5$)$_2$—HO$_3$S—Ph-4-C$_{12}$H$_{25}$; m = 1.5–2.0; n = 0; M = 2H | 5.7 | P | 240 | DG | 2.0 | LiOH | 120 | 63.2; H$_2$Pc new |
| 6 | 10.8 | A = —CH$_2$N-phthalimidyl; m = 5.0; n = 0; M = 2H | 5.7 | H | 240 | BG | 3.3 | NaOH | 160 | 99.6; H$_2$Pc new |
| 7 | 10.8 | A = —CH$_2$N-phthalimidyl; m = 3.0; n = 0; M = 2H | 5.7 | H | 240 | BG | 3.3 | NaOH | 160 | 106.8; H$_2$Pc new |
| 8 | 4.8 | A = —SO$_3$H; m = 1.3; n = 0; M = Cu | 5.0 | H | 350 | DG | 2.0 | LiOH | 120 | 97.5; π-H$_2$Pc |
| 9 | 5.4 | A = —SO$_3$H; m = 1.3; n = 0; M = Cu | 5.0 | H | 400 | DG | 2.0 | LiOH | 120 | 105.8; π-H$_2$Pc |
| 10 | 12.0 | A = —SO$_3$H; m = 1.3; n = 0; M = 2H | 5.0 | H | 240 | DG | 4.0 | LiOH | 140 | 96.7; π-H$_2$Pc |
| 11 | 12.0 | A = —SO$_3$H; m = 1.3; n = 0; M = 2H | 5.7 | P | 440 | DG | 4.0 | LiOH | 140 | 86.5; π-H$_2$Pc |
| 12 | 7.2 | A = —SO$_3$H—H$_2$N—C$_{16}$H$_{33}$; m = 1; B = —Cl; n = 0.1; M = Cu | 5.0 | H | 440 | BG | 3.3 | NaOH | 160 | 98.0; τ-H$_2$Pc |
| 13 | 3.6 | A = —CH$_2$N(C$_2$H$_5$)—HO$_3$S—Ph-4-C$_{12}$H$_{25}$; m = 1.5–2.0; n = 0; m = 2H | 5.7 | P | 300 | PG | 2.2 | LiOH | 160 | 69.9; τ-H$_2$Pc |
| 14 | 10.8 | A = —CH$_2$—N-saccharinyl; m = 3.6; n = 0; M = Cu | 5.0 | H | 340 | BG | 3.3 | NaOH | 120 | 82.7; τ-H$_2$Pc |
| 15 | 6.6 | A = —CH$_2$—N-saccharinyl; m = 2.5; n = 0; M = Cu | 5.7 | P | 240 | BG | 3.3 | NaOH | 160 | 79.9; τ-H$_2$Pc |
| 16 | 3.6 | A = —CH$_2$—N(C$_2$H$_5$)$_2$—HO$_3$S—Ph-4-C$_{12}$H$_{25}$ m = 1.5–2.0; n = 0; M = 2H | 5.0 | H | 490 | BG | 3.3 | NaOH | 160 | 102.2; γ-H$_2$Pc |
| 17 | 7.2 | A = —CH$_2$—N(C$_2$H$_5$)$_2$—HO$_3$S—Ph-4-C$_{12}$H$_{25}$ m = 1.5–2.0; n = 0; M = 2H | 5.7 | P | 340 | BG | 3.3 | NaOH | 160 | 95.6; γ-H$_2$Pc |
| 18 | 3.6 | A = —CH$_2$—N(C$_2$H$_5$)$_2$—HO$_3$S—Ph-4-C$_{12}$H$_{25}$ m = 1.5–2.0; n = 0; M = 2H | 5.7 | P | 340 | BG | 4.6 | KOH | 160 | 69.7; γ-H$_2$Pc |
| 19 | 7.2 | A = —CH$_2$—N(C$_2$H$_5$)$_2$—HO$_3$S—Ph-4-C$_{12}$H$_{25}$ m = 1.5–2.0; n = 0; M = 2H | 5.7 | P | 290 | MDG | 3.3 | NaOH | 170 | 96.1; γ-H$_2$Pc |
| 20 | 7.2 | A = —CH$_2$—N(C$_2$H$_5$)$_2$—HO$_3$S—Ph-4-C$_{12}$H$_{25}$ m = 1.5–2.0; n = 0; M = 2H | 5.0 | H | 290 | DG | 2.0 | LiOH | 120 | 99.3; γ-H$_2$Pc |
| 21 | 8.4 | A = —CH$_2$—N(C$_2$H$_5$)$_2$—HO$_3$S—Ph-4-C$_{12}$H$_{25}$ m = 1.5–2.0; n = 0; M = 2H | 5.0 | H | 490 | DG | 2.0 | LiOH | 120 | 90.9; γ-H$_2$Pc |
| 22 | 7.2 | A = —CH$_2$—N(C$_2$H$_5$)$_2$—HO$_3$S—Ph-4-C$_{12}$H$_{25}$ m = 1.5–2.0; n = 0; M = Cu | 5.0 | H | 540 | BG | 3.3 | NaOH | 160 | 95.1; γ-H$_2$Pc |
| 23 | 7.2 | A = —CH$_2$—N(C$_2$H$_5$)$_2$—HO$_3$S—Ph-4-C$_{12}$H$_{25}$ m = 1.5–2.0; n = 0; M = Cu | 5.7 | P | 540 | MDG | 3.3 | NaOH | 170 | 88.2; γ-H$_2$Pc |
| 24 | 7.2 | A = —CH$_2$—N(C$_2$H$_5$)$_2$—HO$_3$S—Ph-4-C$_{12}$H$_{25}$ m = 1.5–2.0; n = 0; M = Cu | 5.0 | H | 540 | BG | 4.6 | KOH | 160 | 78.9; γ-H$_2$Pc |
| 25 | 7.2 | A = —CH$_2$—N(C$_2$H$_5$)$_2$—HO$_3$S—Ph-4-C$_{12}$H$_{25}$ m = 1.5–2.0; n = 0; M = Cu | 5.7 | P | 490 | BG | 4.6 | KOH | 160 | 76.2; γ-H$_2$Pc |
| 26 | 3.6 | A = —CH$_2$—N(C$_2$H$_5$)$_2$—HO$_3$S—Ph-4-C$_{12}$H$_{25}$ m = 1.5–2.0; n = 0; M = Cu | 5.0 | H | 340 | DG | 2.0 | LiOH | 120 | 97.3; γ-H$_2$Pc |
| 27 | 7.2 | A = —CH$_2$—N(C$_2$H$_5$)$_2$—HO$_3$S—Ph-4-C$_{12}$H$_{25}$ m = 1.5–2.0; n = 0; M = Cu | 5.7 | P | 440 | DG | 2.0 | LiOH | 120 | 105.2; γ-H$_2$Pc |
| 28 | 12.0 | A = —CH$_2$—N-phthalimidyl; m = 3.0–3.5; n = 0; M = Cu | 5.0 | H | 540 | BG | 3.3 | NaOH | 160 | 109.1; γ-H$_2$Pc |
| 29 | 7.2 | A = —CH$_2$—N-phthalimidyl; m = 3.0–3.5; n = 0; M = Cu | 5.7 | P | 390 | MDG | 3.3 | NaOH | 170 | 94.3; γ-H$_2$Pc |
| 30 | 7.2 | A = —CH$_2$—N-phthalimidyl; m = 3.0–3.5; n = 0; M = Cu | 5.0 | H | 390 | DG | 2.0 | LiOH | 120 | 98.7; γ-H$_2$Pc |
| 31 | 12.0 | A = —CH$_2$—N-phthalimidyl; m = 3.0–3.5; n = 0; M = Cu | 5.0 | H | 390 | DG | 2.0 | LiOH | 120 | 105.8; γ-H$_2$Pc |
| 32 | 7.2 | A = —CH$_2$—N-phthalimidyl; m = 3.0–3.5; n = 0; M = Cu | 5.0 | H | 240 | BG | 4.6 | KOH | 160 | 91.2; γ-H$_2$Pc |
| 33 | 7.2 | A = —CH$_2$—N(C$_2$H$_5$)$_2$; m = 3.0; n = 0; M = Cu | 5.0 | H | 340 | BG | 3.3 | NaOH | 160 | 103.5; γ-H$_2$Pc |
| 34 | 7.2 | A = —CH$_2$—N(C$_2$H$_5$)$_2$; m = 3.0; n = 0; M = Cu | 5.0 | H | 240 | BG | 4.6 | KOH | 160 | 89.8; γ-H$_2$Pc |
| 35 | 3.6 | A = —CH$_2$—N(C$_2$H$_5$)$_2$; m = 3.0; n = 0; M = Cu | 5.0 | H | 690 | BG | 2.0 | LiOH | 160 | 96.6; γ-H$_2$Pc |
| 36 | 3.6 | A = —CH$_2$—N(C$_2$H$_5$)$_2$; m = 3.0; n = 0; M = Cu | 5.7 | P | 540 | BG | 3.3 | NaOH | 140 | 83.0; γ-H$_2$Pc |
| 37 | 3.6 | A = —CH$_2$—N(C$_2$H$_5$)$_2$; m = 3.0; n = 0; M = Cu | 5.7 | P | 440 | MDG | 3.3 | NaOH | 170 | 72.0; γ-H$_2$Pc |
| 38 | 7.2 | A = —CH$_2$—N(C$_2$H$_5$)$_2$; m = 3.0; n = 0; M = Cu | 5.0 | H | 240 | MDG | 4.6 | KOH | 150 | 83.5; γ-H$_2$Pc |
| 39 | 3.6 | A = —CH$_2$—N(C$_2$H$_5$)$_2$; m = 3.0; n = 0; M = Cu | 5.7 | P | 490 | MDG | 2.0 | LiOH | 150 | 64.6; γ-H$_2$Pc |
| 40 | 3.6 | A = —CH$_2$—N(C$_2$H$_5$)$_2$; m = 3.0; n = 0; M = Cu | 5.0 | H | 240 | DG | 2.0 | LiOH | 120 | 101.9; γ-H$_2$Pc |
| 41 | 7.2 | A = —CH$_2$—N(C$_2$H$_5$)$_2$; m = 3.0; n = 0; M = Cu | 5.7 | P | 390 | DG | 2.0 | LiOH | 120 | 116.9; γ-H$_2$Pc |
| 42 | 7.2 | A = —CH$_2$—N(C$_2$H$_5$)$_2$; m = 3.0; n = 0; M = Cu | 5.0 | H | 390 | DG | 4.6 | KOH | 120 | 80.5; γ-H$_2$Pc |

TABLE-continued

| Ex. | a g | Phthalocyanine derivative I | b g | II | c ml | G | d g | B | T [° C.] | Yield [g]; polymorph |
|---|---|---|---|---|---|---|---|---|---|---|
| 43 | 7.2 | A = —$CH_2$—$N(C_2H_5)_2$; m = 3.0; n = 0; M = Cu | 5.7 | P | 490 | DG | 4.6 | KOH | 120 | 79.3; $\gamma$-$H_2$Pc |
| 44 | 3.6+ 3.6 | A = —$CH_2$—$N(C_2H_5)_2$; m = 3.0; n = 0; M = Cu | 5.0 | H | 440 | BG | 3.3 | NaOH | 160 | 99.8; $\gamma$-$H_2$Pc |
| 45 | 3.6+ 7.2 | A = —$CH_2$—$N(C_2H_5)_2$; m = 3.0; n = 0; M = Cu | 5.0 | H | 440 | BG | 3.3 | NaOH | 160 | 89.3; $\gamma$-$H_2$Pc |
| 46 | 3.6+ 10.8 | A = —$CH_2$—$N(C_2H_5)_2$; m = 3.0; n = 0; M = Cu | 5.0 | H | 440 | BG | 3.3 | NaOH | 160 | 98.9; $\gamma$-$H_2$Pc |
| 47 | 7.2 | A = $CH_2$—$N(C_2H_5)_2$—$HO_3S$—Ph-4-$C_{12}$—$H_{25}$; m = 1.5–2.0; n = 0; M = Cu | 5.0 | H | 240 | DMAE | 3.3 | NaOH | 135 | 94.2; $\gamma$-$H_2$Pc |
| 48 | 7.2 | A = $CH_2$—$N(C_2H_5)_2$—$HO_3S$—Ph-4-$C_{12}$—$H_{25}$; m = 1.5–2.0; n = 0; M = Cu | 5.0 | H | 440 | DMAE | 3.3 | KOH | 135 | 83.6; $\gamma$-$H_2$Pc |
| 49 | 7.2 | A = $CH_2$—$N(C_2H_5)_2$—$HO_3S$—Ph-4-$C_{12}$—$H_{25}$; m = 1.5–2.0; n = 0; M = Cu | 5.0 | P | 740 | DMAE | 3.3 | NaOH | 135 | 78.9; $\gamma$-$H_2$Pc |
| 50 | 7.2 | A = $CH_2$—$N(C_2H_5)_2$—$HO_3S$—Ph-4-$C_{12}$—$H_{25}$; m = 1.5–2.0; n = 0; M = Cu | 5.0 | P | 350 | DMAE | 3.3 | KOH | 135 | 77.1; $\gamma$-$H_2$Pc |
| 51 | 7.2 | A = —$CH_2$—N-phthalimidyl; m = 3.0–3.5; n = 0; M = Cu | 5.0 | H | 340 | DMAE | 3.3 | NaOH | 135 | 86.3; $\gamma$-$H_2$Pc |
| 52 | 7.2 | A = —$CH_2$—N-phthalimidyl; m = 3.0–3.5; n = 0; M = Cu | 5.0 | H | 340 | DMAE | 3.3 | KOH | 135 | 84.7; $\gamma$-$H_2$Pc |
| 53 | 7.2 | A = —$CH_2$—N-phthalimidyl; m = 3.0–3.5; n = 0; M = Cu | 5.0 | P | 240 | DMAE | 3.3 | KOH | 135 | 80.2; $\gamma$-$H_2$Pc |
| 54 | 7.2 | A = —$CH_2$—N-phthalimidyl; m = 3.0–3.5; n = 0; M = Cu | 5.0 | P | 240 | DMAE | 3.3 | NaOH | 135 | 85.6; $\gamma$-$H_2$Pc |
| 55 | 7.2 | A = —$CH_2$—$N(C_2H_5)_2$; m = 3.0; n = 0; M = Cu | 5.0 | H | 290 | DMAE | 3.3 | KOH | 135 | 88.9; $\gamma$-$H_2$Pc |
| 56 | 7.2 | A = —$CH_2$—$N(C_2H_5)_2$; m = 3.0; n = 0; M = Cu | 5.0 | H | 240 | DMAE | 3.3 | NaOH | 135 | 100.1; $\gamma$-$H_2$Pc |
| 57 | 7.2 | A = —$CH_2$—$N(C_2H_5)_2$; m = 3.0; n = 0; M = Cu | 5.0 | P | 240 | DMAE | 3.3 | KOH | 135 | 81.6; $\gamma$-$H_2$Pc |
| 58 | 7.2 | A = —$CH_2$—$N(C_2H_5)_2$; m = 3.0; n = 0; M = Cu | 5.0 | P | 240 | DMAE | 3.3 | NaOH | 135 | 81.1; $\gamma$-$H_2$Pc |

We claim:

1. A process for preparing metal-free phthalocyanine with control of the polymorph by reductive cyclization of phthalonitrile in the presence of an aliphatic alcohol, of a redox catalyst and of an inorganic base, which comprises effecting the cyclization in the presence of one or more phthalocyanine derivatives selected from the group consisting of phthalocyanine-sulfonic acids and -carboxylic acids and their alkali metal, ammonium and alkylammonium salts, the amino-substituted and aminomethylated phthalocyanines and their reaction products with alkylating agents, sulfonic acids, sulfonyl chlorides and carbonyl chlorides, the imidomethylene- and amidomethylene-substituted phthalocyanines, the alkyl-, aryl- and cyano-substituted phthalocyanines, the hydroxyl- and alkoxy-substituted phthalocyanines and their reaction products with tetraalkyl- and tetraalkoxy-silanes and the halogenated phthalocyanines.

2. A process as claimed in claim 1, wherein the phthalocyanine derivative used has the general formula I

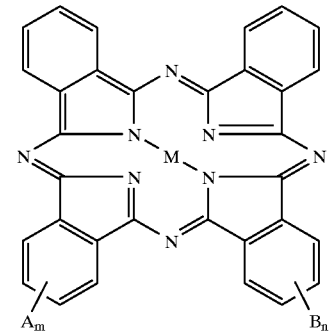

where
M is copper or 2 hydrogen atoms;
A and B are each independently selected from the following substituents: —$SO_3M^1$, —$CO_2M^1$, —$SO_3H.HNR^1R^2$, —$CH_2NR^3R^4$, $R^3R^4$, $CH_2NR^3R^4.HO_3SR^5$, —$NR^3R^4.HO_3SR^5$, —$NHCOR^1$, —$CH_2NHCOR^1$, —$NHSO_2R^1$, —$CH_2NHSO_2R^1$, —$SO_2NHR^1$, —$CONHR^1$, $C_1$–$C_6$-alkyl, aryl, cyano, —$OR^6$ and halogen, where $R^1$ and $R^2$ are each independently of the other hydrogen or $C_2$–$C_{20}$-alkenyl or $C_1$–$C_{20}$-alkyl with or without —$NR^7R^8$ substitution, $R^7$ and $R^8$ each being independently of the other $C_1$–$C_{20}$-alkyl, $C_5$–$C_8$-cycloalkyl with or without one or more hetero atoms, or hydrogen, $R^3$ and $R^4$ are each independently of the other hydrogen, $C_1$–$C_{20}$-alkyl, $C_2$–$C_{20}$-alkenyl or aryl or join to form a 5- or 6-membered ring which contains the nitrogen atom and optionally further heteroatoms or carbonyl or sulfonyl groups and is or is not benzofused, .

$R^5$ is p-($C_{10}$–$C_{20}$-alkyl)phenyl or $C_2$–$C_{20}$-alkenyl, $R^6$ is hydrogen, $C_1$–$C_6$-alkyl or —$Si(R^9)_3$, where $R^9$ is $C_1$–$C_4$-alkyl, $C_2$–$C_4$-alkenyl or $C_1$–$C_4$-alkoxy, and $M^1$ is hydrogen or an alkali metal;

m is an integer or fraction >0 to 4.0; and n is an integer or fraction from 0 to 4.0.

3. A process as claimed in claim 1, wherein the phthalocyanine derivative used has the formula I where M is copper or 2 hydrogen atoms;

A and B are each independently selected from the following substituents: —$SO_3H$, —$SO_3H.HNR^1R^2$, $CH_2NR^3R^4$, —$CH^2NR^3R^4.HO_3SR^5$ and halogen, where $R^1$ and $R^2$ are each independently of the other $C_1$–$C_{20}$-alkyl or hydrogen, $R^3$ and $R^4$ are each independently of the other $C_1$–$C_6$-alkyl or hydrogen or join to form a benzofused 5-membered ring which contains the nitrogen atom and also carbonyl or sulfonyl groups;

$R^5$ is p-($C_{10}$–$C_{20}$-alkyl)phenyl;

m is an integer or fraction >0 to 4; and n is an integer or fraction from 0 to 4.0, subject to the proviso of the sum of m=n assuming a value from 0.1 to 4.

4. A process as claimed in claim 1, wherein the phthalocyanine derivative is used in an amount from 1 to 20% by weight, based on the amount of phthalonitrile used.

5. A process as claimed in claim 1, wherein the aliphatic alcohol used is selected from $C_2$–$C_5$-alkylene mono-, oligo- or polyglycols, their mono-$C_1$–$C_8$-alkyl or -aryl ethers or amino- or N,N-di-($C_1$–$C_4$-alkyl)amino-$C_2$–$C_6$-alcohols or mixtures thereof.

6. A process as claimed in claim 1, wherein the redox catalyst used is an aromatic compound of the general formula II

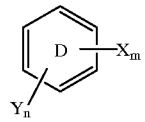

II where X is hydroxyl or mercapto, Y is hydroxyl, mercapto, amino, $C_1$–$C_6$-alkylamino, halogen, $C_1$–$C_6$-alkyl, $C_1$–$C_6$-alkoxy or $C_1$–$C_6$-alkoxycarbonyl, m is an integer from 1 to 4, n is an integer from 0 to 5, subject to the proviso of the sum of m+n being $\leq 6$, and the benzene ring D is or is not fused to a further benzene ring.

7. A process as claimed in claim 1, wherein the redox catalyst used is a di- or trihydroxybenzene.

8. A process as claimed in claim 1, wherein the inorganic base used is selected from alkali metal hydroxides, oxides, carbonates or mixtures thereof.

9. A method of coloring printing inks, paints and plastics, which comprises incorporating the metal-free phthalocyanine prepared as claimed in claim 1 into said printing inks, paints and plastics.

10. A novel polymorph of metal-free phthalocyanine, characterized by an X-ray powder diagram (CuK$_\alpha$) having the essential lines at 2θ angles of 5.0, 8.3, 9.6, 13.0, 14.4, 16.8, 21.5, 24.2 and 26.8°.

11. A printing ink, paint or plastic, comprising the novel polymorph of metal-free phthalocyanine of claim 10.

12. A process as claimed in claim 1, wherein the phthalocyanine derivative has a degree of substitution of 0.1 to 4.0.

13. A process as claimed in claim 1, wherein said process is carried out under atmospheric pressure.

14. A process as claimed in claim 1, wherein said process produces said metal-free phthalocyanine in the π polymorph.

15. A process as claimed in claim 1, wherein said process produces said metal-free phthalocyanine in the τ polymorph.

16. A process as claimed in claim 1, wherein said process produces said metal-free phthalocyanine in the γ polymorph.

17. A process as claimed in claim 14, wherein no seed crystals are used in said process.

18. A process as claimed in claim 15, wherein no seed crystals are used in said process.

19. A process as claimed in claim 16, wherein no seed crystals are used in said process.

* * * * *

UNITED STATES PATENT AND TRADEMARK OFFICE
CERTIFICATE OF CORRECTION

PATENT NO. : 5,932,723
DATED : August 3, 1999
INVENTOR(S) : Andrea Birgit SCHÜTZE, et al.

It is certified that error appears in the above-identified patent and that said Letters Patent is hereby corrected as shown below:

On the title page, item [30] is missing. It should be:

--[30]      Foreign Application Priority Data
     Dec. 16, 1996 [DE] Germany .............. 196 52 241 --.

Signed and Sealed this

Twenty-sixth Day of September, 2000

Attest:

Q. TODD DICKINSON

*Attesting Officer*      *Director of Patents and Trademarks*